United States Patent
Lee et al.

(10) Patent No.: US 8,325,841 B2
(45) Date of Patent: Dec. 4, 2012

(54) METHOD FOR TRANSMITTING SIGNALS FOR REDUCING FEEDBACK OVERHEAD AND METHOD FOR TRANSMITTING FEEDBACK INFORMATION FOR THE SAME

(75) Inventors: Moon Il Lee, Ayang-si (KR); Hyun Soo Ko, Ayang-si (KR); Bin Chul Ihm, Ayang-si (KR); Wook Bong Lee, Ayang-si (KR); Jae Hoon Chung, Ayang-si (KR)

(73) Assignee: LG Electronics Inc., Seoul (KR)

( * ) Notice: Subject to any disclaimer, the term of this patent is extended or adjusted under 35 U.S.C. 154(b) by 661 days.

(21) Appl. No.: 12/382,631

(22) Filed: Mar. 19, 2009

(65) Prior Publication Data

US 2009/0245410 A1    Oct. 1, 2009

Related U.S. Application Data

(60) Provisional application No. 61/038,773, filed on Mar. 23, 2008.

(30) Foreign Application Priority Data

Aug. 18, 2008    (KR) .................. 10-2008-0080462

(51) Int. Cl.
*H04B 7/02*    (2006.01)
*H04L 1/02*    (2006.01)
(52) U.S. Cl. ................. 375/267; 375/295; 375/216
(58) Field of Classification Search ............... 375/267, 375/295, 216
See application file for complete search history.

(56) References Cited

U.S. PATENT DOCUMENTS

2006/0029157 A1    2/2006 Dabak et al.
2009/0028264 A1*   1/2009 Zhang et al. .................. 375/267

FOREIGN PATENT DOCUMENTS

| JP | 2009-520484 | 5/2009 |
| JP | 2010-527571 | 8/2010 |
| KR | 10-2006-0130062 | 12/2006 |
| KR | 10-2007-0049050 | 5/2007 |

OTHER PUBLICATIONS

3GPP TS 36.211: "Physical Channels and Modulation", Technical Specification Group Radio Access Network; 3rd Generation Partnership Project (Release 8), V1.1.0 (May 2007).*
LG Electronics, "Further consideration on 2Tx Open-loop SM", 3GPP TSG RAN WG1 Meeting #52bis, Shenzhen, China, Mar. 31-Apr. 4, 2008, R1-081266.

(Continued)

*Primary Examiner* — Shuwang Liu
*Assistant Examiner* — Nader Bolourchi
(74) *Attorney, Agent, or Firm* — McKenna Long & Aldridge LLP (57)    ABSTRACT

A method for transmitting signals to reduce feedback overhead and a method for transmitting feedback information for the same are described. In transmitting signals through precoding, different codebook subsets are used in an open-loop transmission mode and a closed-loop transmission mode, thereby reducing feedback overhead. In this case, it is assumed that the codebook subsets for the respective transmission modes are optimized according to each transmission mode.

6 Claims, 2 Drawing Sheets

OTHER PUBLICATIONS

Nortel, "Signaling support for downlink MIMO mode adaptation", 3GPP TSG-RAN Working Group 1, Meeting #48bis, St. Julian's, Malta, Mar. 26-30, 2007, R1-071459.

Samsung, "Way forward for MU-MIMO Design", 3GPP TSG RAN WG1 Meeting #49bis, Orlando, Fl, Jun. 25-29, 2007, R1-073100.

Huawei, "Completing the 2 TX codebook", TAG RAN WG1 meeting #50bis, Shanghai, China, Oct. 8-12, 2007, R1-074228.

Nortel, "Further discussion on DL/UL signaling channel supporting rank adaptation for high mobility UE", 3GPP TSG-RAN 1 Meeting #51bis, Seville, Spain, Jan. 14-18, 2008, R1-080375.

Ericsson, "Precoding considerations in LTE MIMO downlink", TSG-RAN WG1, #47bis, Sorrento, Italy, Jan. 15-19, 2007, R1-070466.

* cited by examiner

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-j\end{bmatrix}$ | - |

Subset for open-loop

Subset for closed-loop

↑

| Codebook index | Number of rank | |
|---|---|---|
| | 1 | 2 |
| 0 | $\begin{bmatrix}1\\0\end{bmatrix}$ | $\frac{1}{\sqrt{2}}\begin{bmatrix}1 & 0\\0 & 1\end{bmatrix}$ |
| 1 | $\begin{bmatrix}0\\1\end{bmatrix}$ | $\frac{1}{\sqrt{2}}\begin{bmatrix}1 & 1\\1 & -1\end{bmatrix}$ |
| 2 | $\frac{1}{\sqrt{2}}\begin{bmatrix}1\\1\end{bmatrix}$ | $\frac{1}{\sqrt{2}}\begin{bmatrix}1 & 1\\j & -j\end{bmatrix}$ |
| 3 | $\frac{1}{\sqrt{2}}\begin{bmatrix}1\\-1\end{bmatrix}$ | - |
| 4 | $\frac{1}{\sqrt{2}}\begin{bmatrix}1\\j\end{bmatrix}$ | - |
| 5 | $\frac{1}{\sqrt{2}}\begin{bmatrix}1\\-j\end{bmatrix}$ | - |

METHOD FOR TRANSMITTING SIGNALS FOR REDUCING FEEDBACK OVERHEAD AND METHOD FOR TRANSMITTING FEEDBACK INFORMATION FOR THE SAME

CROSS-REFERENCE TO RELATED APPLICATIONS

This application claims the benefit of the U.S. Provisional Application No. 61/038,773, filed on Mar. 23, 2008, which is hereby incorporated by reference as if fully set forth herein.

This application claims the benefit of the Korean Patent Application No. 10-2008-0080462, filed on Aug. 18, 2008, which is hereby incorporated by reference as if fully set forth herein.

BACKGROUND OF THE INVENTION

1. Field of the Invention

The present invention relates to a multiple-antenna wireless communication system, and more particularly, to a method for efficiently constructing a codebook subset to reduce feedback overhead for precoding, and a method for transmitting and receiving signals using the same.

2. Discussion of the Related Art

With the popularization of information communication services, the appearance of various multimedia services, and the provision of high-quality services, demand for a fast wireless communication service has rapidly increased. To actively cope with such demand, first of all the capacity of a communication system should be increased. To increase communication capacity in a wireless communication environment, there can be considered a method for finding new available frequency bands and a method for increasing efficiency of restricted resources. As to the latter method, a multiple-input multiple-output (MIMO) technology has recently attracted much attention and has been actively developed. The MIMO technology obtains a diversity gain by equipping a transmitting side and a receiving side with a plurality of antennas to additionally ensure space for utilizing resources, or increases transmission capacity by transmitting data in parallel through the respective antennas.

In brief, MIMO refers to a method capable of improving transmission/reception data efficiency using multiple transmit antennas and multiple receive antennas, instead of a conventional method employing one transmit antenna and one receive antenna. That is, MIMO is a technology utilizing multiple antennas in a transmitting side or a receiving side of a wireless communication system to increase capacity or improve performance. Hereinafter, MIMO is referred to as "multiple antenna(s)".

The multiple antenna technology is a technology for restoring data by collecting pieces of data received through several antennas, instead of depending on a single antenna path, in order to receive one overall message. The multiple antenna technology achieves an improvement in data transmission rate at a specific range or an increase in a system range for a specific data transmission rate.

It is predicted that an efficient multiple antenna technology is indispensable because next-generation mobile communication demands a much higher data transmission rate than conventional mobile communication. Under such circumstances, the MIMO communication technology is a next-generation mobile communication technology which can be widely applied to mobile communication terminals and repeaters, and is drawing attention as a technique to overcome limitations in mobile communication capacity, which is increasingly limited due to expansion of data communication.

Meanwhile, among various technologies for improving transmission efficiency which are currently being studied, the MIMO technology using multiple antennas in both a transmitter and a receiver is most noteworthy as a method of remarkably improving communication capacity and transmission/reception performance without increasing additional frequency allocation or power consumption.

Figure 1:
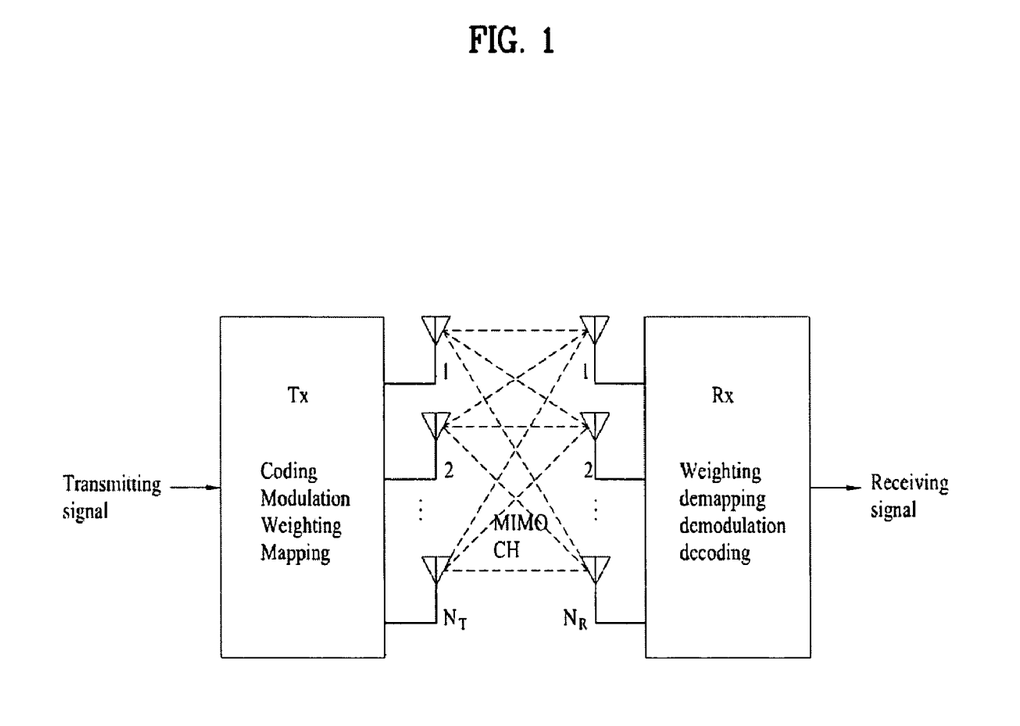
FIG. 1 is a view illustrating a configuration of a general MIMO communication system.

FIG. 1 is a view illustrating a configuration of a general MIMO communication system.

If the numbers of transmit and receive antennas are simultaneously increased to $N_T$ and $N_R$, respectively, a theoretical channel transmission capacity is increased in proportion to the number of antennas, unlike the case where only either a transmitter or a receiver uses multiple antennas. Accordingly, a transmission rate can be increased and infrequency efficiency can be remarkably improved. The transmission rate due to an increase in a channel transmission capacity can be theoretically increased by a value obtained by multiplying the following rate increase $R_i$ by a maximum transmission rate Ro when using one antenna.

$$R_i = \min(N_T, N_R) \quad \text{[Equation 1]}$$

For example, a MIMO communication system using 4 transmit antennas and 4 receive antennas can theoretically obtain 4 times the transmission rate of a single antenna system.

Since an increase in the theoretical capacity of the multiple antenna system was first demonstrated in the mid-1990s, various techniques for substantially improving a data transmission rate have been actively developed. Several of these techniques have already been applied to a variety of wireless communication standards such as the $3^{rd}$ generation mobile communication and the next-generation wireless local area network.

Research up to now related to multiple antenna technologies has been actively conducted in many aspects, including research into information theory related to the computation of multiple antenna communication in various channel environments and in multiple access environments, research into wireless channel measurement and model introduction of a multiple antenna system, and research into space-time signal processing technologies for improving transmission reliability and a transmission rate.

The multiple antenna technology includes a spatial diversity scheme for increasing transmission reliability using symbols passing through various channel paths and a spatial multiplexing scheme for improving a transmission rate by simultaneously transmitting a plurality of data symbols using a plurality of transmit antennas. Recently, research into a method of combining the above-described schemes to take advantage of the respective schemes has been carried out.

A description of the aforementioned schemes will now be given in detail.

First, the spatial diversity scheme includes a space-time block coding method, and a trellis coding method using both a diversity gain and a coding gain. The trellis coding is generally excellent in terms of the improvement of a bit error rate and the degree of freedom in generating codes but the space-time block coding method is simple in terms of computation. The spatial diversity gain can be obtained up to the extent corresponding to a multiplication ($N_T \times N_R$) of the number $N_T$ of transmit antennas and the number $N_R$ of receive antennas.

Second, the spatial multiplexing scheme transmits different data streams through respective transmit antennas. At this time, in a receiver, mutual interference may be generated between data which is simultaneously transmitted from a transmitter. Then the receiver eliminates the interference using proper signal processing methods and receives the data. The receiver used for eliminating the interference includes a maximum likelihood receiver, a zero forcing (ZF) receiver, a minimum means-squared errors (MMSE) receiver, a diagonal Bell laboratories layered space-time (D-BLAST) receiver, and a vertical Bell laboratories layered space-time (V-BLAST) receiver. Especially, if the transmitter could recognize channel information, a singular value decomposition (SVD) method may be used to eliminate the interference.

Third, a combination of the spatial diversity scheme and the spatial multiplexing scheme may be used. If only the spatial diversity gain is obtained, a performance improvement gain caused by an increase in a diversity order is gradually saturated. If only the spatial multiplexing gain is obtained, the transmission reliability of a wireless channel is decreased. Accordingly, studies on a method for solving theses shortcomings and simultaneously obtaining those two gains have been conducted. As a result, a double space-time transmit diversity (double-STTD), and a space-time bit interleaved coded modulation (STBICM) have been used.

In the aforementioned multiple antenna system, the transmitting side precodes transmission data and then transmits the precoded data, and the receiving side receives the data using a precoding matrix (or precoding vector) used in the transmitting side.

Meanwhile, the precoding matrix for performing precoding uses one of precoding matrixes which are specified in the form of codebooks which is prescribed by both the transmitting side and the receiving side. A transmission mode of the transmitting side may be divided into an open-loop transmission mode and a closed-loop transmission mode according to whether the precoding matrix used by the transmitting side demands feedback information from the receiving side.

In the open-loop transmission mode, the transmitting side transmits signals using a precoding matrix without using feedback information from the receiving side. In the closed-loop transmission mode, however, the receiving side indicates a specific precoding matrix(s) among previously specified codebooks according to a receiving signal by feeding back channel information, etc., and the transmitting side transmits signals using the feedback information.

The open-loop transmission mode and the closed-loop transmission mode may have different requirements. However, the open-loop transmission mode and the closed-loop transmission mode do not have separate code subsets according to transmission modes. Therefore, feedback information of the receiving side in the closed-loop transmission mode should use large amount of information in order to indicate a precoding matrix used among the entire precoding matrixes including the codebook and thus overhead may be generated.

SUMMARY OF THE INVENTION

Technical Problem

An object of the present invention devised to solve the problem lies in providing a method for reducing the above-described feedback overhead by specifying separate codebook subsets with respect to an open-loop transmission mode and a close-loop transmission mode.

The codebook subsets for respective transmission modes should be determined according to characteristics of the transmission modes. Thus, another object of the present invention devised to solve the problem lies in providing a method for efficiently selecting a codebook subset used for each transmission mode from an exiting codebook specification.

Technical Solution

The object of the present invention can be achieved by providing a method for transmitting signals, including: selecting a prescribed precoding matrix from a codebook which is predetermined between a transmitting side and a receiving side; and performing precoding with respect to a transmitting signal using the selected precoding matrix, wherein the precoding matrix is selected from different subsets of the codebook depending on whether the transmitting side uses an open-loop transmission mode or a closed-loop transmission mode.

If the transmitting side transmits signals using two transmit antennas, the code book may use the following table:

| Codebook Index | Number of Rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | |

If the transmitting side uses the closed-loop transmission mode, the transmitting side may not employ a precoding matrix corresponding to index 0 for the number of rank 2 case (hereinafter, rank-2) in the codebook. If the transmitting side uses the open-loop transmission mode, the performing of precoding may use a fixed one precoding matrix, preferably, $$\frac{1}{\sqrt{2}}\begin{bmatrix}1&0\\0&1\end{bmatrix}.$$

If the transmitting side transmits signals using two transmit antennas and uses the closed-loop transmission mode, the precoding matrix used for precoding may be selected from a subset shown in the following table:

| Codebook Index | Number of Rank | |
|---|---|---|
| | 1 | 2 |
| 0 | $\frac{1}{\sqrt{2}}\begin{bmatrix}1\\1\end{bmatrix}$ | $\frac{1}{2}\begin{bmatrix}1&1\\1&-1\end{bmatrix}$ |
| 1 | $\frac{1}{\sqrt{2}}\begin{bmatrix}1\\-1\end{bmatrix}$ | $\frac{1}{2}\begin{bmatrix}1&1\\j&-j\end{bmatrix}$ |

-continued

| Codebook Index | Number of Rank | |
|---|---|---|
| | 1 | 2 |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | |

If the transmitting side uses the closed-loop transmission mode, the method for transmitting signals may further comprise receiving feedback information for selecting the precoding matrix from the receiving side, wherein the feedback information may have two bits for rank-2 and one bit for rank-1.

In another aspect of the present invention, provided herein is a method for transmitting feedback information, comprising: generating feedback information about a prescribed precoding matrix to be used by a transmitting side according to a receiving signal, from a codebook which is predetermined between the transmitting side and a receiving side; and transmitting the generated feedback information about the precoding matrix to the transmitting side, wherein the codebook is set to employ different subsets for the cases when a closed-loop transmission mode is used and when an open-loop transmission mode is used, and wherein the feedback information about the precoding matrix is set to indicate a specific precoding matrix within the subset used for the closed-loop transmission mode in the codebook.

If the transmitting side transmits signals using two transmit antennas, the code book may use the following table:

| Codebook Index | Rank Number | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |
| 2 | $\frac{1}{\sqrt{2}}\begin{bmatrix}1\\j\end{bmatrix}$ | $\frac{1}{2}\begin{bmatrix}1&1\\j&-j\end{bmatrix}$ |
| 3 | $\frac{1}{\sqrt{2}}\begin{bmatrix}1\\-j\end{bmatrix}$ | | and the subset used for the closed-loop transmission mode may exclude a precoding matrix corresponding to index 0 for rank-2 in the codebook.

The information about the precoding matrix may have a two-bit length for rank-2 and a one-bit length for rank-1.

ADVANTAGEOUS EFFECTS

According to the embodiments of the present invention, feedback overhead can be reduced by using different codebook subsets depending on whether a transmitting side employs an open-loop transmission mode or a closed-loop transmission mode. And system performance can be improved by using an optimized codebook subset for each transmission mode.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

In accordance with one aspect of the present invention, there is provided a method for reducing feedback overhead by specifying separate codebook subsets according to transmission modes, based on recognition that different requirements are needed for an open-loop transmission mode and a closed-loop transmission mode. To this end, a description will be given to a method using separate subsets of a codebook specified in a current $3^{rd}$ generation partnership project long term evolution (3GPP LTE) system. However, the following description may be applied not only to the 3GPP LTE system but to any systems in which a transmitting side transmits signals using precoding and an open-loop transmission mode or a closed-loop transmission loop is selectively applicable.

The current 3GPP LTE system specifies a codebook for two transmit antennas (2-Tx) as follows.

TABLE 1

| Codebook Index | Number of Rank | |
|---|---|---|
| | 1 | 2 |
| 0 | $\begin{bmatrix}1\\0\end{bmatrix}$ | $\frac{1}{\sqrt{2}}\begin{bmatrix}1&0\\0&1\end{bmatrix}$ |
| 1 | $\begin{bmatrix}0\\1\end{bmatrix}$ | $\frac{1}{2}\begin{bmatrix}1&1\\1&-1\end{bmatrix}$ |

TABLE 1-continued

| Codebook Index | Number of Rank 1 | Number of Rank 2 |
|---|---|---|
| 2 | $\frac{1}{\sqrt{2}}\begin{bmatrix} 1 \\ 1 \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -1 \end{bmatrix}$ | — |
| 4 | $\frac{1}{\sqrt{2}}\begin{bmatrix} 1 \\ j \end{bmatrix}$ | — |
| 5 | $\frac{1}{\sqrt{2}}\begin{bmatrix} 1 \\ -j \end{bmatrix}$ | — |

As indicated in Table 1, the 2-Tx codebook includes 6 vectors for rank-1 transmission and 3 matrixes for rank-2 transmission. Assuming that semi-static rank application is performed, feedback overhead of 3 bits and feedback overhead of two bits are necessary for rank-1 and rank-2, respectively. The term 'precoding vector' refers to a specific matrix in which the number of columns is 1 among 'precoding matrixes'. Hereinafter the precoding vector will be referred to as the precoding matrix unless such use causes confusion.

However, some specific precoding matrixes in the codebook indicated in Table 1 are not appropriate for closed-loop transmission in terms of system operation. For example, antenna selection matrixes for rank-1, especially, antenna selection matrixes such as matrixes of index 0 and index 1 for rank-1 in Table 1 are not appropriate when implemented. Furthermore, a matrix corresponding to index 1 for rank-2, which is an identity matrix, may not be appropriate because the identity matrix does not yield any precoding gain in a closed-loop system. However, the above-described identity matrix may provide a spatial multiplexing gain in an open-loop system because the identity matrix does not form beam patterns in a correlated environment.

The present invention provides a method for reducing feedback overhead by employing separate codebook subsets according to transmission modes, based on recognition that inappropriate precoding matrixes exist for each transmission mode. In particular, since feedback information is necessary only in a closed-loop transmission mode, a description will be mainly given of the closed-loop transmission mode.

A codebook proposed according to one embodiment of the present invention based on the afore-stated description is as follows.

TABLE 2

| Codebook Index | Number of Rank 1 | Number of Rank 2 |
|---|---|---|
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 0 & 1 \\ j & -j \end{bmatrix}$ |

TABLE 2-continued

| Codebook Index | Number of Rank 1 | Number of Rank 2 |
|---|---|---|
| 3 | $\frac{1}{\sqrt{2}}\begin{bmatrix} 1 \\ -j \end{bmatrix}$ | |

Compared with the codebook of Table 1, the codebook of Table 2 does not include antenna selection matrixes corresponding to index 0 and index 1 for rank-1 in Table 1, which are not proper for use in both the open-loop transmission mode and the closed-loop transmission mode. In one embodiment of the present invention, however, an identity matrix of index 0 for rank-2 in Table 2 is set to be used only in the open-loop transmission mode. Namely, in the open-loop transmission mode, a transmitting side may fixedly use a matrix of index 0 for rank-2 in Table 2 as a precoding matrix, without having feedback information from a receiving side. Accordingly, a codebook subset used in the closed-loop system may be expressed as follows.

TABLE 3

| Codebook Index | Number of Rank 1 | Number of Rank 2 |
|---|---|---|
| 0 | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ j & -j \end{bmatrix}$ |
| 2 | $\frac{1}{\sqrt{2}}\begin{bmatrix} 1 \\ j \end{bmatrix}$ | |
| 3 | $\frac{1}{\sqrt{2}}\begin{bmatrix} 1 \\ -j \end{bmatrix}$ | |

As indicated in Table 3, the codebook subset used in the closed-loop system includes four precoding matrixes for rank-1 and two precoding matrixes for rank-2. Therefore, the receiving side requires feedback information of two bits for rank-1 and feedback information of one bit for rank-2. A matrix $$\frac{1}{\sqrt{2}}\begin{bmatrix} 1 & 0 \\ 0 & 1 \end{bmatrix}$$

is used in the open-loop transmission mode as a fixed precoding matrix without precoding index feedback.

The embodiment of the present invention may be summarized as follows.

Figure 2:
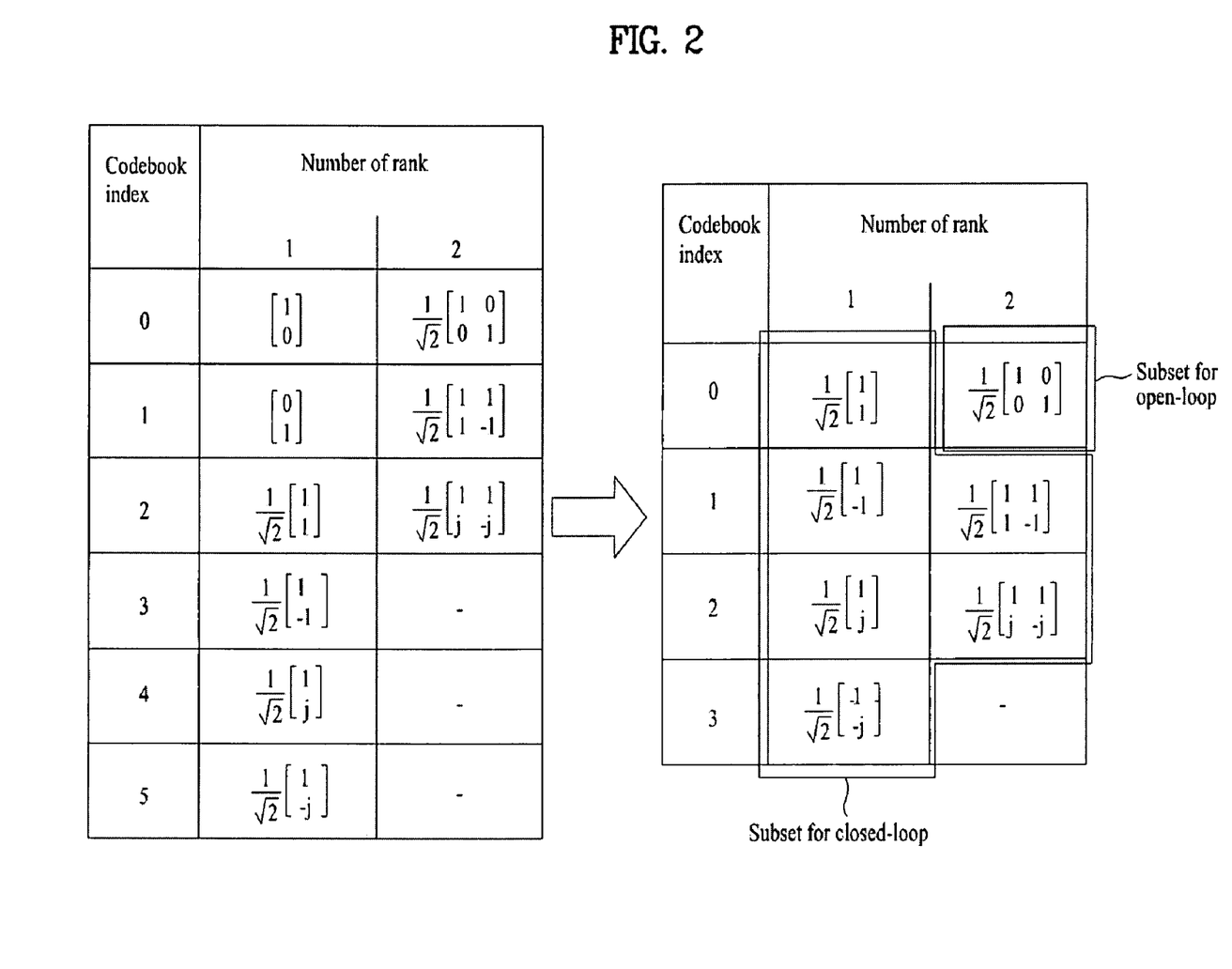
FIG. 2 is a view explaining the concept of a method of setting and using codebook subsets according to transmission modes in accordance with an exemplary embodiment of the present.

FIG. 2 is a view explaining the concept of a method of setting and using codebook subsets according to transmission modes in accordance with an exemplary embodiment of the present invention.

Precoding matrixes which are not proper for use in either the open-loop transmission mode or the closed-loop transmission mode may be eliminated from a currently used codebook shown in the left side of FIG. 2. In one exemplary embodiment of the present invention, antenna selection matrixes corresponding to index 0 and index 1 for rank-1 are eliminated. A codebook in which unnecessary precoding matrixes are eliminated is shown in the right side of FIG. 2.

However, since inappropriate precoding matrixes for each transmission mode exist even in the codebook in which the unnecessary precoding matrixes are eliminated, the exemplary embodiment of the present invention proposes a method of setting and using separate codebook subsets according to the transmission modes. In FIG. 2, an identity matrix corresponding to index 0 for rank-2 is used as a fixed precoding matrix in the open-loop transmission mode and the identity matrix is eliminated in the closed-loop transmission mode. A receiving side in the closed-loop transmission mode may express precoding matrixes through feedback information of two bits for rank-1 and feedback information of one bit for rank-2.

Meanwhile, in a multiple antenna system, layer refers to different information transmitted simultaneously through multiple antennas and rank refers to the number of independent channels. More specifically, in a multiple antenna system which transmits signals through a channel H using $N_T$ transmit antennas and $N_R$ receive antennas, the following relationship is satisfied:

(number of layers)$\leq$Rank($H$)$\leq$min($N_T,N_R$).

However, it is assumed that the number of rank corresponds to the number of layers in Table 2, Table 3, and FIG. 2. The number of rank in Table 2 and Table 3 may be changed to the number of layers as follows.

TABLE 4

| Codebook Index | Number of layers $\upsilon$ | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

TABLE 5

| Codebook Index | Number of layers $\upsilon$ | |
| --- | --- | --- |
| | 1 | 2 |
| 0 | $\frac{1}{\sqrt{2}}\begin{bmatrix}1\\1\end{bmatrix}$ | $\frac{1}{2}\begin{bmatrix}1 & 1\\1 & -1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\j & -j\end{bmatrix}$ |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | |

Table 4 and Table 5 correspond to Table 2 and Table 3, respectively.

In the above-described embodiment, while the amount of feedback information for rank-2 is described as being decreased to one bit from two bits, the amount of feedback information is desirably the same for each rank according to a system. In this case, another embodiment of the present invention proposes a method of transmitting additional information using number of cases, while maintaining the number of bits of feedback information for rank-2 at two bits. The additional information may include column swapping version information of index 0 and index 1, strong stream indicator, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The signal transmitting method and the feedback information transmitting method according to the exemplary embodiments of the present invention can reduce feedback information overhead using specified codebook subsets for respective transmission modes and can perform optimized precoding according to the transmission modes. It is apparent that the above method may be applied not only to a 3GPP LTE system but also to any multiple antenna communication systems to which the open-loop transmission mode and the closed-loop transmission mode are selectively applicable in a multiple antenna system using precoding by the same principle.

What is claimed is:

1. A method for transmitting signals using two transmit antennas at a transmitting side, the method comprising:
   selecting a prescribed precoding matrix from a codebook which is predetermined between the transmitting side and a receiving side;
   performing precoding with respect to a signal using the selected precoding matrix; and
   transmitting the signal to the receiving side using the two transmit antennas,
   wherein the precoding matrix is selected from different subsets of the codebook depending on whether the transmitting side uses an open-loop transmission mode or a closed-loop transmission mode,
   wherein the codebook uses the following table:

| Codebook Index | Number of Rank | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

, and wherein the transmitting side does not employ the precoding matrix corresponding to index 0 for the number of rank 2 case in the codebook, when the transmitting side uses the closed-loop transmission mode, and receiving feedback information for selecting the precoding matrix when the transmitting side uses the closed-loop transmission mode, wherein the overhead associated with the feedback information is reduced from a bit length of two to a bit length of one for rank 2 whenever the transmitting side uses the closed-loop transmission mode.

2. The method according to claim 1, wherein performing precoding uses a fixed one of the precoding matrices in the codebook, when the transmitting side uses the open-loop transmission mode.

3. The method according to claim 2, wherein the fixed one of the precoding matrices is $$\frac{1}{\sqrt{2}}\begin{bmatrix} 1 & 0 \\ 0 & 1 \end{bmatrix}.$$

4. A method for transmitting feedback information at a receiving side, the method comprising:

generating feedback information about a prescribed precoding matrix to be used by a transmitting side according to a receiving signal, from a codebook which is predetermined between the transmitting side and the receiving side, wherein the receiving signal is transmitted using two transmit antennas from the transmitting side; and transmitting the generated feedback information about the precoding matrix to the transmitting side, wherein the codebook is set to employ different subsets for the cases when a closed-loop transmission mode is used and when an open-loop transmission mode is used, and wherein the feedback information about the precoding matrix is set to indicate a specific precoding matrix within the subset used for the closed-loop transmission mode in the codebook, wherein the codebook uses the following table:

| Codebook Index | Number of Rank 1 | Number of Rank 2 |
|---|---|---|
| 0 | $\frac{1}{\sqrt{2}}\begin{bmatrix} 1 \\ 1 \end{bmatrix}$ | $\frac{1}{\sqrt{2}}\begin{bmatrix} 1 & 0 \\ 0 & 1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ 1 & -1 \end{bmatrix}$ |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | | and wherein the subset used for the closed-loop transmission mode excludes the precoding matrix corresponding to index 0 for the number of rank 2 case in the codebook, and transmitting the feedback information for selecting the precoding matrix when the transmitting side uses the closed-loop transmission mode, wherein the overhead associated with the feedback information is reduced from a bit length of two to a bit length of one for rank 2 whenever the transmitting side uses the closed-loop transmission mode.

5. The method according to claim 4, wherein precoding uses a fixed one of the precoding matrices in the codebook when open-loop transmission mode is used.

6. The method according to claim 5, wherein the fixed one of the precoding matrices is $$\frac{1}{\sqrt{2}}\begin{bmatrix} 1 & 0 \\ 0 & 1 \end{bmatrix}.$$

* * * * *

UNITED STATES PATENT AND TRADEMARK OFFICE
CERTIFICATE OF CORRECTION

| | | |
|---|---|---|
| PATENT NO. | : 8,325,841 B2 | Page 1 of 1 |
| APPLICATION NO. | : 12/382631 | |
| DATED | : December 4, 2012 | |
| INVENTOR(S) | : Moon Il Lee et al. | |

It is certified that error appears in the above-identified patent and that said Letters Patent is hereby corrected as shown below:

Col. 12, Claim 4, at line 26, delete the words "transmitting the feedback information for selecting the precoding matrix when the transmitting side uses the closed loop transmission mode," before the words "wherein the overhead associated".

Signed and Sealed this
Nineteenth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,325,841 B2 | Page 1 of 1 |
| APPLICATION NO. | : 12/382631 | |
| DATED | : December 4, 2012 | |
| INVENTOR(S) | : Moon Il Lee et al. | |

It is certified that error appears in the above-identified patent and that said Letters Patent is hereby corrected as shown below:

In the Claims

Col. 11, Claim 1, at line 5, delete "the" and insert --a--, immediately preceding the word "precoding".

Signed and Sealed this
Nineteenth Day of August, 2014

Michelle K. Lee
*Deputy Director of the United States Patent and Trademark Office*